United States Patent
Ozturk et al.

(10) Patent No.: US 12,207,229 B2
(45) Date of Patent: *Jan. 21, 2025

(54) RESOLUTION OF PAGING COLLISIONS IN MULTI-SIM AND C-RAT OPERATION

(71) Applicant: QUALCOMM Incorporated, San Diego, CA (US)

(72) Inventors: Ozcan Ozturk, San Diego, CA (US); Gavin Bernard Horn, La Jolla, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/661,071

(22) Filed: Apr. 28, 2022

(65) Prior Publication Data

US 2022/0256499 A1    Aug. 11, 2022

Related U.S. Application Data

(63) Continuation of application No. 16/714,665, filed on Dec. 13, 2019, now Pat. No. 11,356,975.

(Continued)

(51) Int. Cl.
*H04W 68/02* (2009.01)
*H04W 24/08* (2009.01)
(Continued)

(52) U.S. Cl.
CPC .......... *H04W 68/02* (2013.01); *H04W 24/08* (2013.01); *H04W 76/27* (2018.02); *H04W 76/30* (2018.02)

(58) Field of Classification Search
CPC ..... H04W 68/02; H04W 76/30; H04W 76/27; H04W 24/08; H04W 84/045;
(Continued)

(56) References Cited

U.S. PATENT DOCUMENTS 10,772,152 B2 * 9/2020 Rune ............... H04W 76/28
11,716,703 B2 * 8/2023 Li ............... H04W 36/0033
370/329

(Continued)

FOREIGN PATENT DOCUMENTS

CN    106714305 A    5/2017
EP    3742831 A1    11/2020

(Continued)

OTHER PUBLICATIONS

Zaidi, Syed Muhammad Asad, et al. "Mobility management in emerging ultra-dense cellular networks: A survey, outlook, and future research directions." IEEE Access 8 (2020): 183505-183533 (Year: 2020).*

(Continued)

*Primary Examiner* — Sharad Rampuria

(57) ABSTRACT

Certain aspects of the present disclosure provide techniques for resolving paging collisions, for example, for a UE camped on multiple cells. In some cases, a UE detects, based on paging configurations, a conflict between configured paging occasions of at least two cells on which the UE is camped, signals an indication of the conflict to at least one of the cells, and receives information regarding a new paging configuration designed to resolve the conflict. In some cases, a UE identifies a different cell to camp on that is not subject to the conflict, wherein the different cell is not as good a candidate for cell selection as one of the conflicting cells in terms of cell selection criteria, and camps on the identified cell.

12 Claims, 11 Drawing Sheets

Related U.S. Application Data

(60) Provisional application No. 62/780,129, filed on Dec. 14, 2018.

(51) Int. Cl.
*H04W 76/27* (2018.01)
*H04W 76/30* (2018.01)

(58) Field of Classification Search
CPC ... H04W 88/06; H04W 68/005; H04W 36/04; H04W 48/12; H04W 48/20; H04W 24/02; H04W 24/00; H04B 17/00; H04J 3/14; H04L 43/00; H04L 43/50
See application file for complete search history.

(56) References Cited

U.S. PATENT DOCUMENTS

| | | | |
|---|---|---|---|
| 2003/0125073 A1 | 7/2003 | Tsai et al. | |
| 2009/0156257 A1* | 6/2009 | Shi | H04W 48/12 455/558 |
| 2012/0052869 A1* | 3/2012 | Lindoff | H04J 11/0069 455/452.1 |
| 2012/0135730 A1* | 5/2012 | Rangaiah | H04W 48/20 455/434 |
| 2012/0269173 A1* | 10/2012 | Chin | H04W 68/12 370/332 |
| 2013/0150105 A1* | 6/2013 | Clevorn | H04W 48/12 455/507 |
| 2013/0244660 A1 | 9/2013 | Kumar et al. | |
| 2014/0106750 A1* | 4/2014 | Roullier | H04W 68/02 455/436 |
| 2014/0128082 A1* | 5/2014 | Chirayil | H04W 68/02 455/438 |
| 2015/0038154 A1 | 2/2015 | Ponukumati et al. | |
| 2017/0230932 A1* | 8/2017 | Challa | H04W 68/02 |
| 2018/0027466 A1* | 1/2018 | Trott | H04W 36/302 455/437 |
| 2018/0192436 A1* | 7/2018 | Yi | H04W 72/23 |
| 2018/0343638 A1 | 11/2018 | Balasubramanian et al. | |
| 2019/0281580 A1* | 9/2019 | Rune | H04W 76/28 |
| 2020/0196273 A1 | 6/2020 | Ozturk et al. | |

FOREIGN PATENT DOCUMENTS

| | | |
|---|---|---|
| WO | 2011056250 A1 | 5/2011 |
| WO | 2011059521 A1 | 5/2011 |
| WO | 2015073448 A1 | 5/2015 |
| WO | 2018161244 A1 | 9/2018 |
| WO | 2018176219 A1 | 10/2018 |

OTHER PUBLICATIONS

Gures, Emre, et al. "A comprehensive survey on mobility management in 5G heterogeneous networks: Architectures, challenges and solutions." IEEE Access 8 (2020): 195883-195913. (Year: 2020).*

Amirijoo, Mehdi, et al. "Neighbor cell relation list and physical cell identity self-organization in LTE." ICC Workshops—2008 IEEE International Conference on Communications Workshops. IEEE, 2008. (Year: 2008).*

Gao C., et al., "Exploiting Parallelism in I/O Scheduling for Access Conflict Minimization in Flash-based Solid State Drives", 2014 30th Symposium on Mass Storage Systems and Technologies (MSST), IEEE, 2014, 11 Pages.

International Preliminary Report on Patentability—PCT/US2019/066411 The International Bureau of WIPO—Geneva, Switzerland, Jun. 24, 2021.

International Search Report and Written Opinion—PCT/US2019/066411—ISA/EPO—Mar. 19, 2020.

Pan Q., et al., "Cluster-Based Group Paging for Massive Machine Type Communications Under 5G Networks", IEEE Access 6, pp. 64891-64904, 2018.

* cited by examiner

RESOLUTION OF PAGING COLLISIONS IN MULTI-SIM AND C-RAT OPERATION

PRIORITY CLAIM(S)

This application is a continuation of U.S. patent application Ser. No. 16/714,665, filed on Dec. 13, 2019, and entitled "Resolution of Paging Collisions in Multi-SIM and C-RAT Operation", which claims priority to and benefit of U.S. Provisional Patent Application Ser. No. 62/780,129, filed on Dec. 14, 2018, and entitled "Resolution of Paging Collisions in Multi-SIM and C-RAT Operation", the contents of both of which are hereby incorporated by reference in their entirety as if fully set forth below and for all applicable purposes.

FIELD OF THE DISCLOSURE

Aspects of the present disclosure relate to wireless communications, and more particularly, to techniques for resolving the collision of paging occurrences when a UE is camped on more than one cell.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes detecting, based on paging configurations, a conflict between configured paging occasions of at least two cells on which the UE is camped and signaling an indication of the conflict to at least one of the cells and receiving information regarding a new paging configuration designed to resolve the conflict.

Certain aspects provide a method for wireless communication by a network entity. The method generally includes detecting, based on paging configurations, a conflict between configured paging occasions of at least two cells on which a user equipment (UE) is camped and providing information regarding a new paging configuration designed to resolve the conflict.

Certain aspects provide a method for wireless communication by a user equipment (UE). The method generally includes detecting, based on paging configurations, a conflict between configured paging occasions of at least two cells on which the UE is camped, receiving information from at least one of the cells regarding a plurality of possible paging occasions for that cell, and monitoring for paging in one of the possible paging occasions not subject to the conflict.

Certain aspects provide a method for wireless communication by a network entity. The method generally includes signaling information to a user equipment (UE) regarding a plurality of possible paging occasions and paging the UE in the possible paging occasions.

Certain aspects provide a method for wireless communication by a user equipment (UE). The method generally includes detecting, based on paging configurations, a conflict between configured paging occasions of at least two cells on which the UE is camped, identifying a different cell to camp on that is not subject to the conflict, wherein the different cell is not as good a candidate for cell selection as one of the conflicting cells in terms of cell selection criteria, and camping on the identified cell.

Certain aspects provide means for, apparatus, and/or computer readable medium having computer executable code stored thereon, for techniques described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
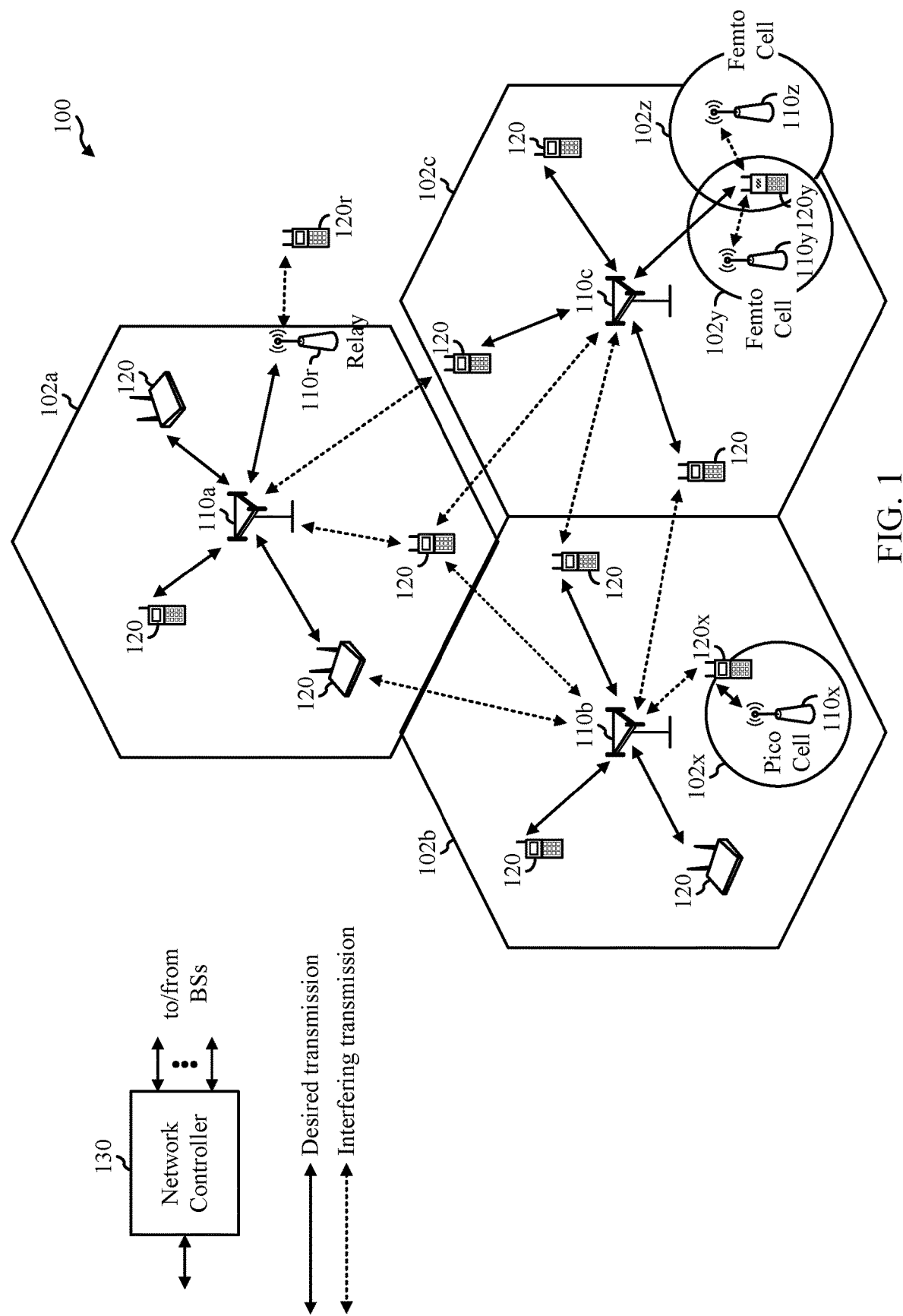
FIG. 1 is a block diagram conceptually illustrating an example telecommunications system, in accordance with certain aspects of the present disclosure.

Aspects of the present disclosure provide apparatus, methods, processing systems, and computer readable mediums for resolving the collision of paging occurrences when a UE is camped on more than one cell. The techniques may be implemented in wireless systems in which a UE may be camped on multiple cells, which may be of the same or different radio access technologies (RATs).

As used herein, the term camping generally means a UE has found a suitable cell, based on an available frequency band (e.g., PSS and SSS), found the physical cell ID, and decoded PBCH and SIBs to obtain the required information for initial access to the cell. In other words, the UE is ready to access the cell but may be waiting to actually establish a connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network, with one or more UEs 120 configured to perform operations of FIGS. 7, 9, and/or 11 to resolve the collision of paging occurrences when a UE is camped on more than one cell. In some cases, such cells may be served by a base station 110 configured to perform operations of FIGS. 8 and/or 10).

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
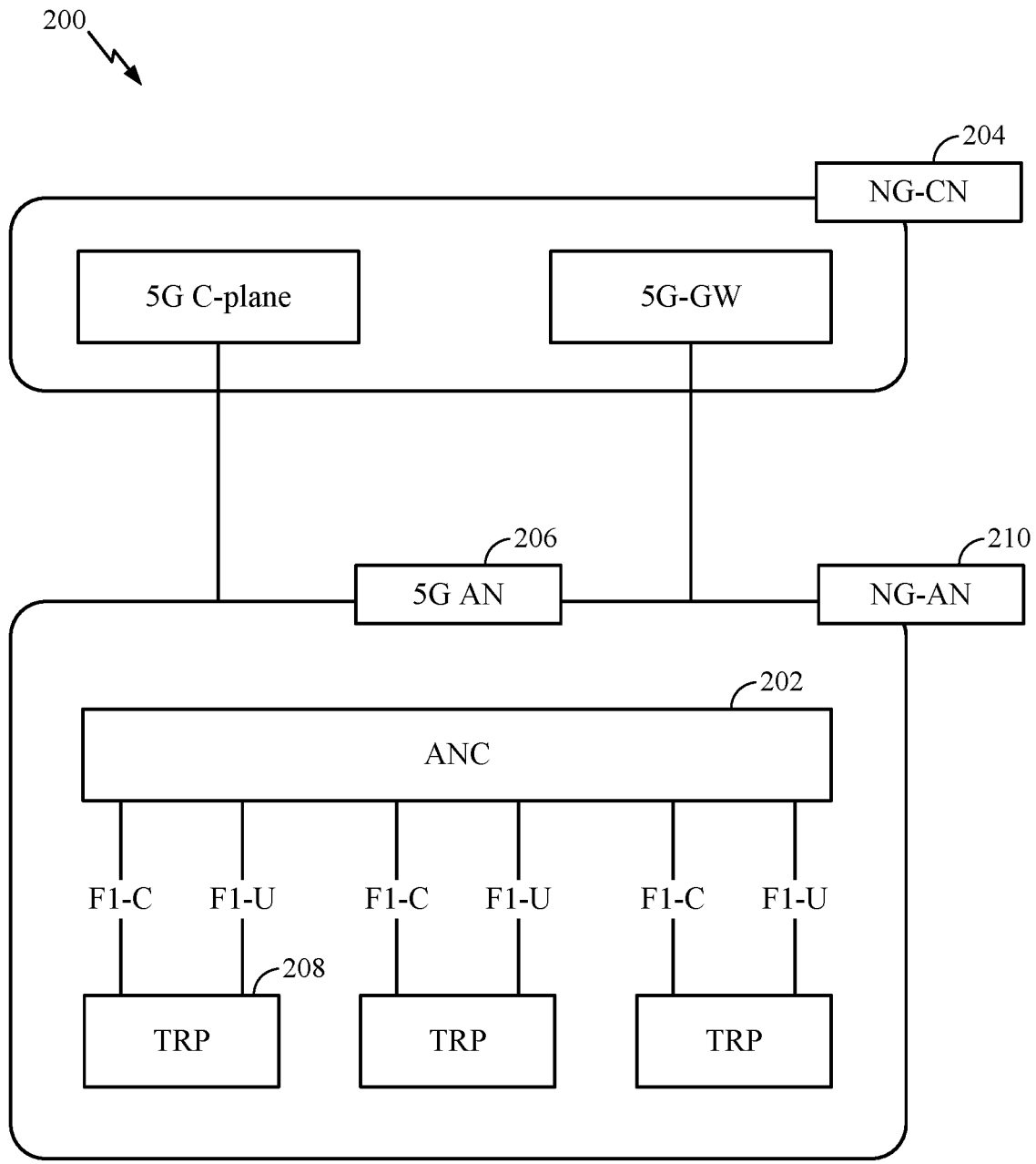
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
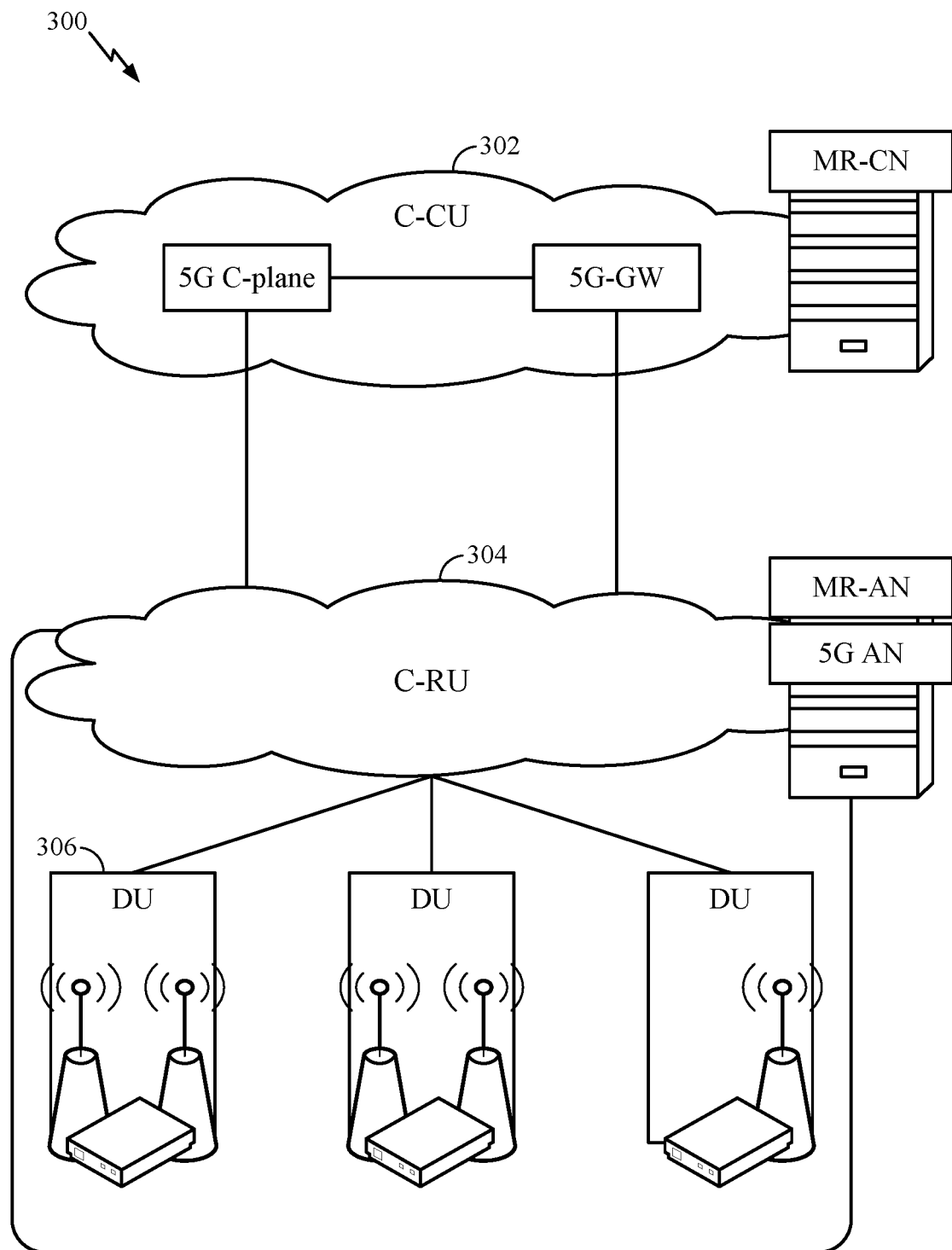
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
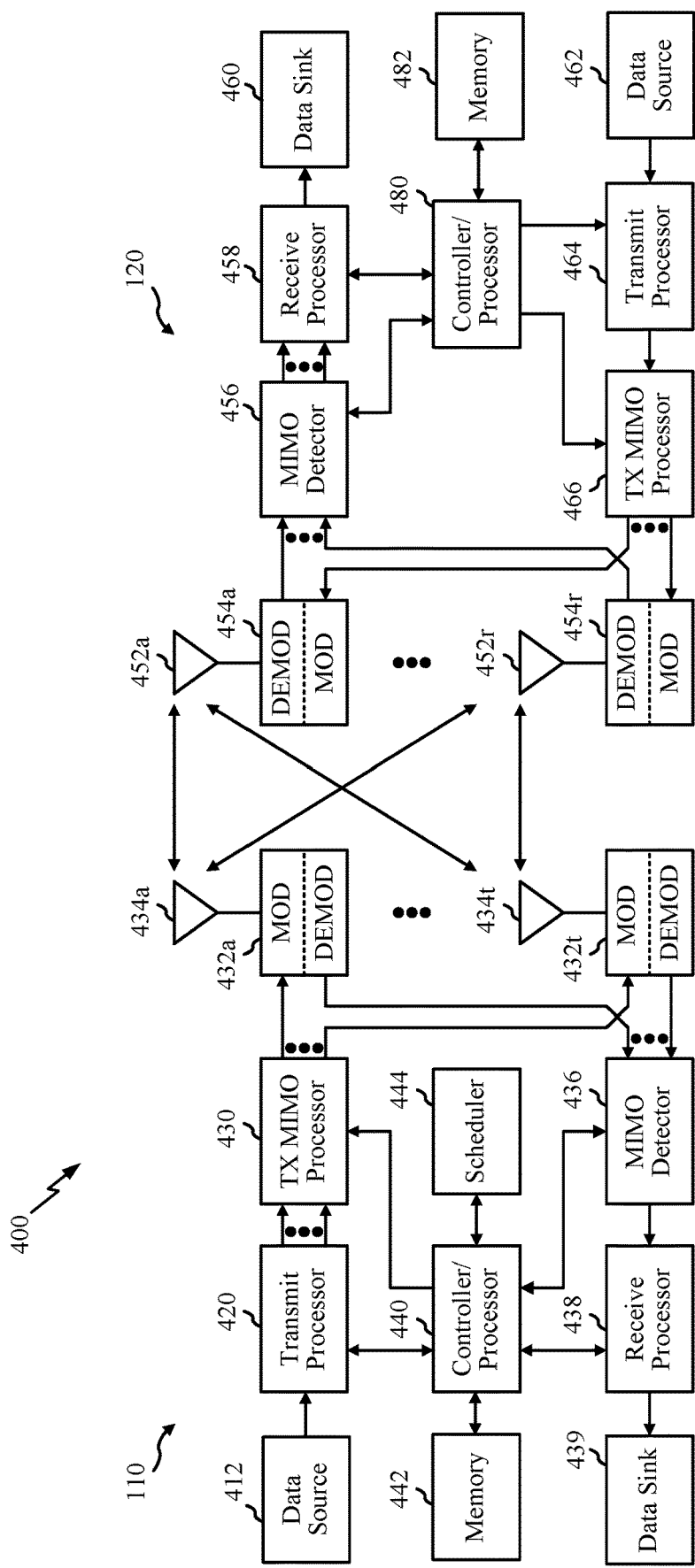
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations of FIGS. 7, 9, and/or 11. Similarly, antennas 434, processors 420, 430, 438, and/or controller/processor 440 of the BS 110 may be used to perform operations of FIGS. 8 and/or 10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
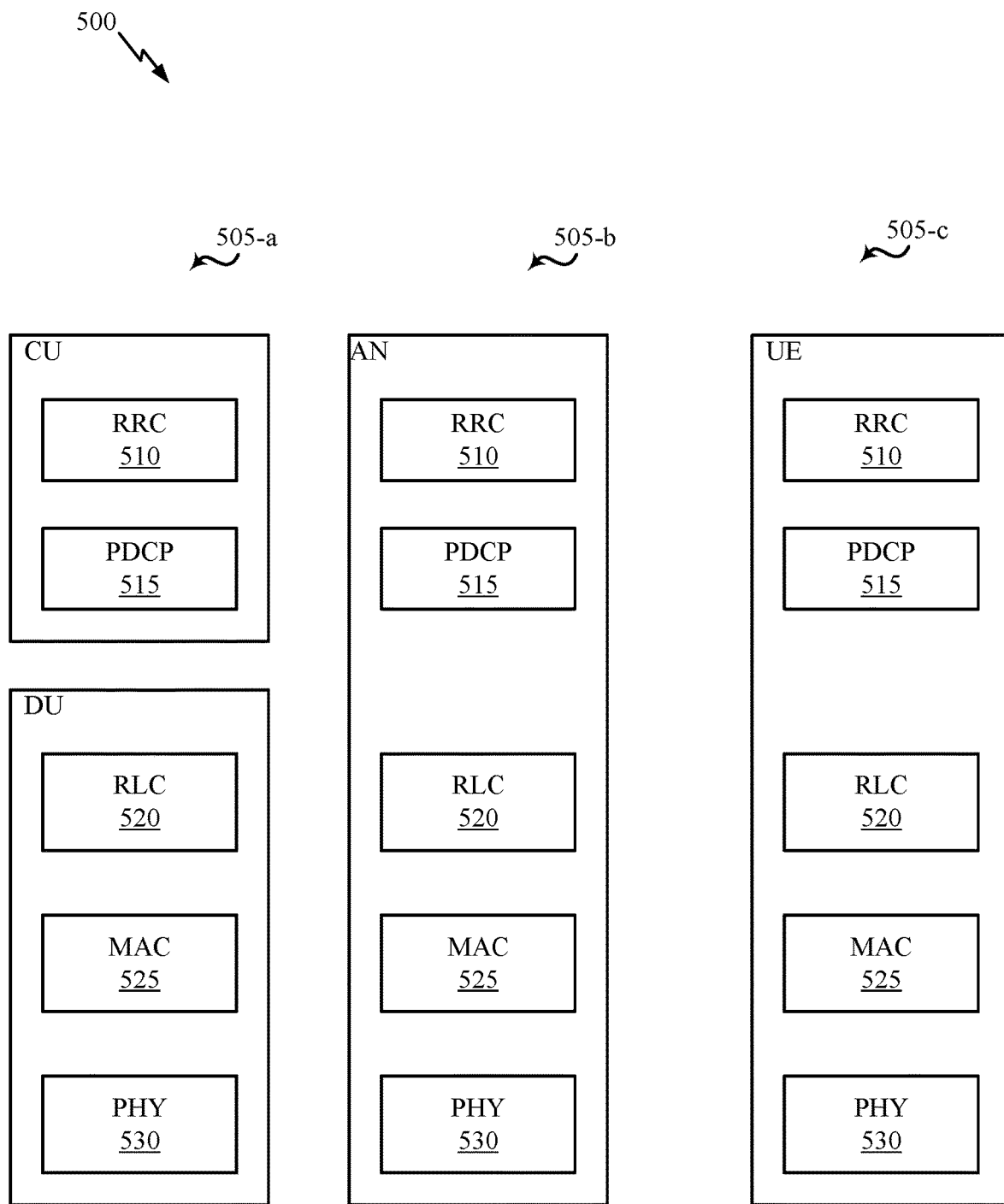
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
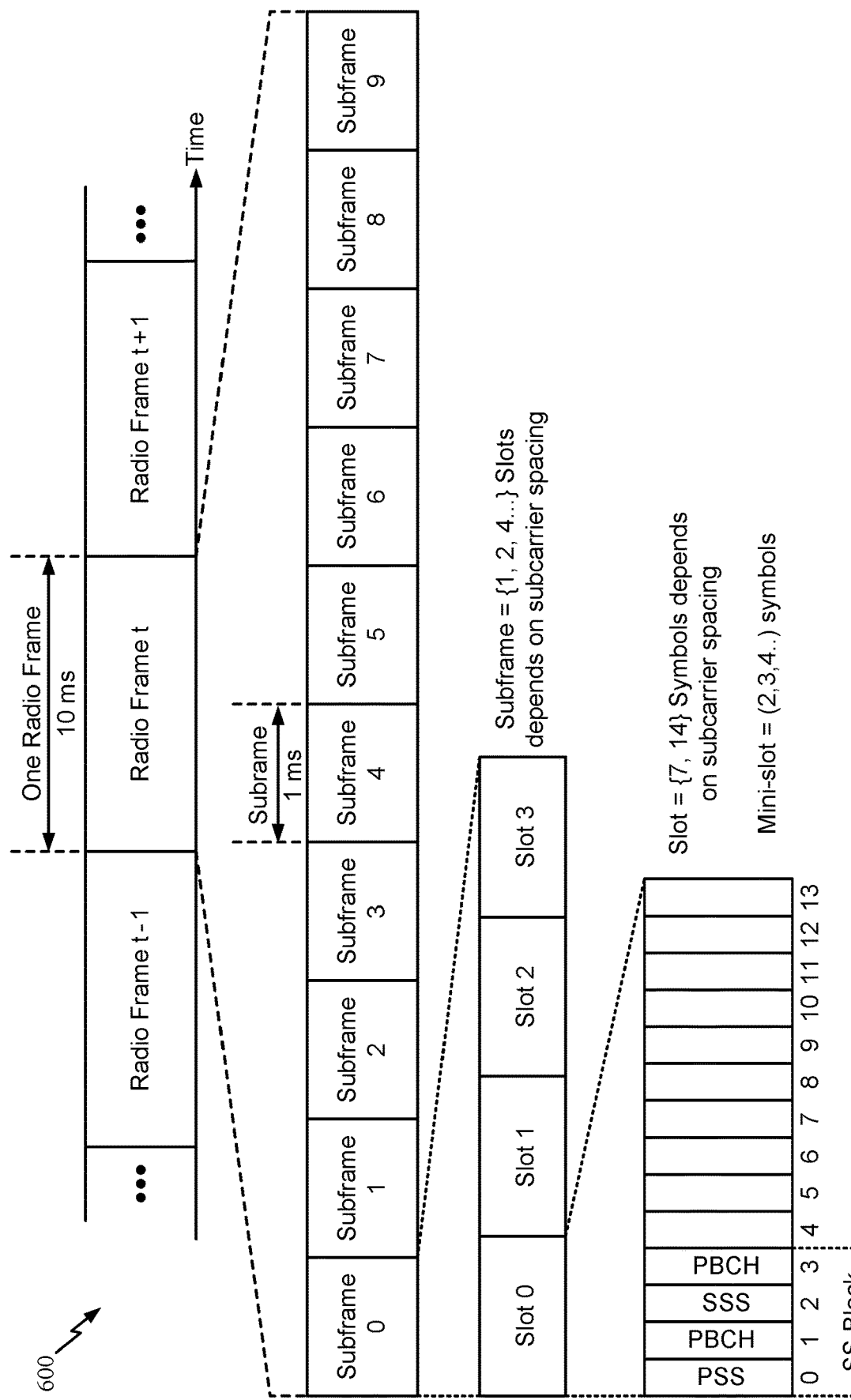
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Resolution of Paging Collisions

There are various types of scenarios where a UE may camp on multiple cells and need to monitor for paging in each, which may present challenges. For example, in C-RAT (concurrent RAT) and multi-SIM scenarios (e.g., where a UE uses different subscriber identification modules or SIMS in different networks or to have different phone numbers in a same network), a UE may not have the capability to receive data or signaling simultaneously on both access links. A particular case is Idle/Inactive mobility where the UE camps on a cell on each RAT or public land mobile network (PLMN) while being able to receive paging only one at a time.

Exactly how paging occurrences are determined may vary depending on the particular RAT. In LTE, the paging frame and occasion are calculated based on cell level paging parameters (DRX cycle, number of paging occasions in a cycle) and an international mobile subscriber identity (IMSI). Unfortunately, many cells in an area can use the same cell parameters, which makes it fairly likely that paging occasions will collide if the UE camps on two LTE cells. As used herein, the term collision refers to paging occasions in different cells that overlap such that a UE may only be able to monitor for paging in one of the cells during a paging occurrence subject to collision.

In NR, the UE identity used for paging is based on the last 10 digits of a serving temporary mobile subscriber identity (S-TMSI) assigned the UE. Another difference compared to LTE is that the number of paging frames and number of paging occasions (PO) corresponding to a paging frame (PF) are configured separately. NR also allows configuring offsets for each paging occasion, making the placement of a paging occasion for a UE very flexible.

Paging collisions may occur when a UE is dual camping on two NR or two LTE cells or one NR and one LTE cell. For example, it is possible that the paging occasions can collide between cells. Since the paging cycle values are all $2^n*10$ ms, when collision happens, it will repeat itself periodically even if the paging cycles are different across cells.

Aspects of the present disclosure provide various solutions that may help address this paging collision problem. As a result, overall system performance and user experience may be improved, as end users may be reached sooner than if the paging collisions were not resolved.

The various solutions apply different signaling options. The various solutions may be applied to a wide variety of RAT systems such as NR, LTE, eLTE, as well as any inter-RAT deployment deploying a combination of such RATs.

According to a first example solution, a UE signals the network when it detects a paging collision, allowing the network to modify a paging configuration for the UE in an effort to resolve the paging collision.

Figure 7:
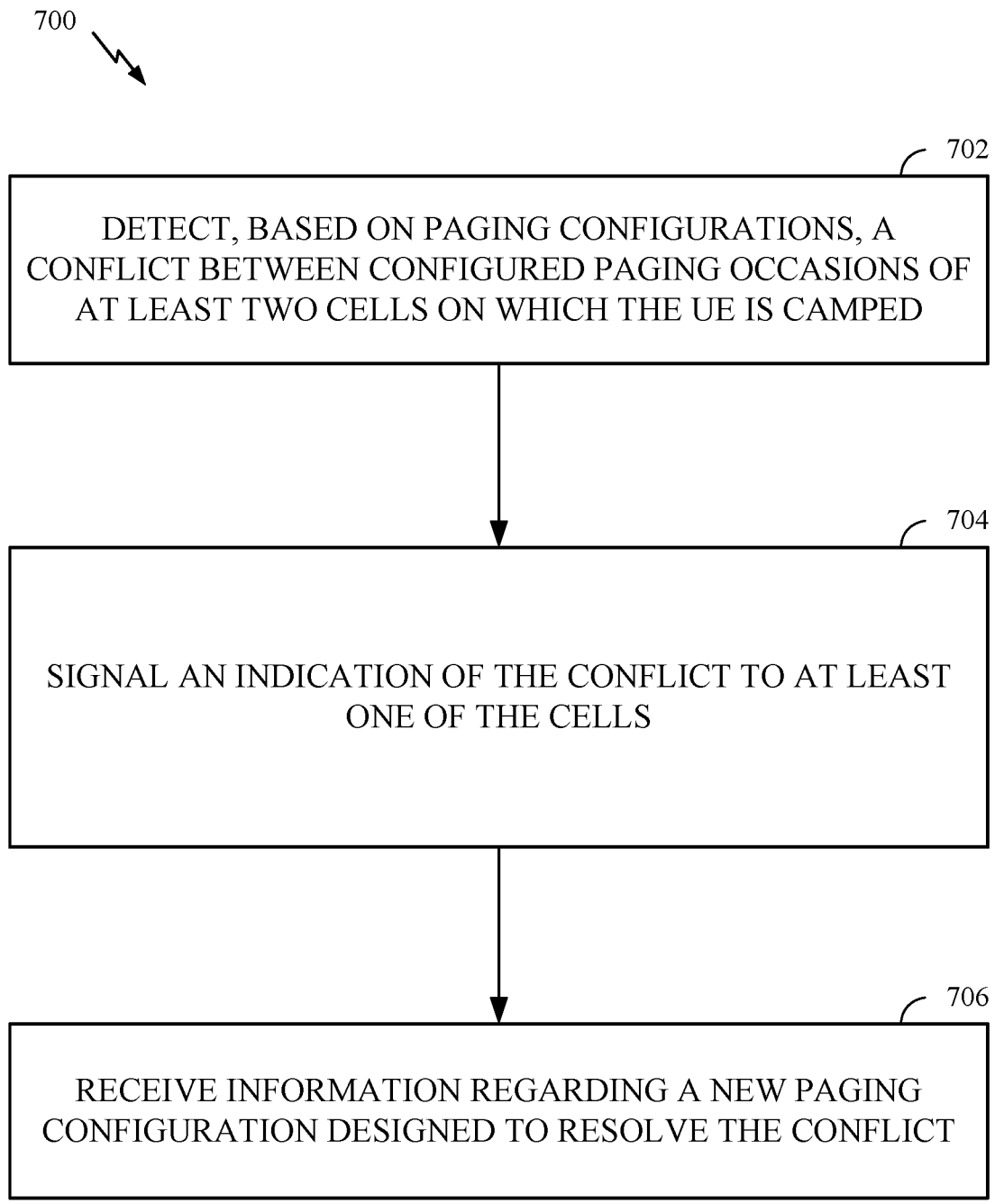
FIG. 7 is a flow diagram illustrating example operations that may be performed by a UE, in accordance with certain aspects of the present disclosure.

FIG. 7 is a flow diagram illustrating example operations 700 by a UE, in accordance with this first example solution. The operations 700 may be performed, for example, by a UE (e.g., such as a UE 120 in the wireless communication network 100) for resolving paging collisions.

Operations 700 begin, at 702, by detecting, based on paging configurations, a conflict between configured paging occasions of at least two cells on which the UE is camped. At 704, the UE signals an indication of the conflict to at least one of the cells. At 706, the UE receives information regarding a new paging configuration designed to resolve the conflict.

Figure 8:
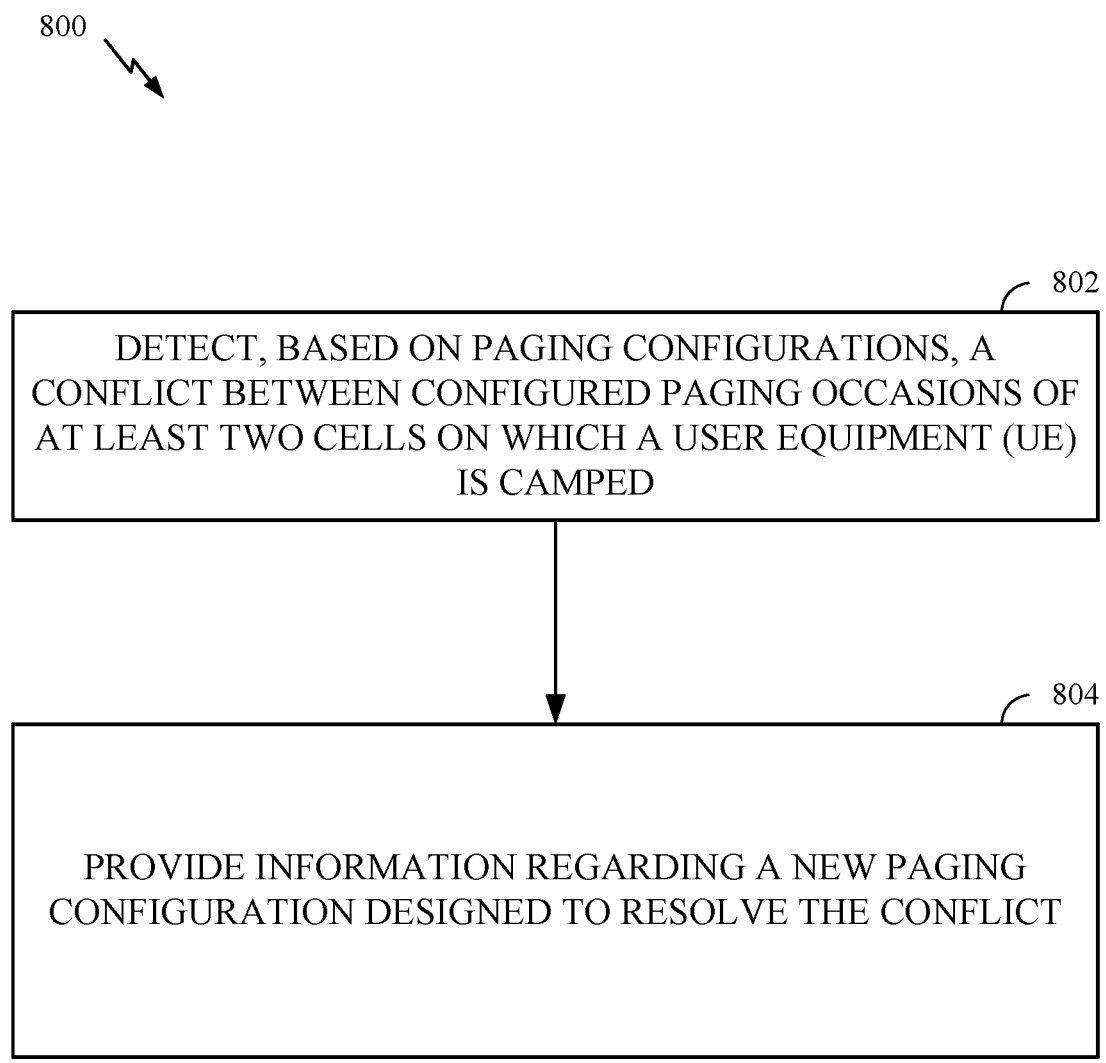
FIG. 8 is a flow diagram illustrating example operations that may be performed by a network entity, in accordance with certain aspects of the present disclosure.

FIG. 8 is a flow diagram illustrating example operations 800 for wireless communications by a network, in accordance with this first example solution. In other words, operations 800 may be considered network-side operations that are complementary to operations 700 described above. The operations 800 may be performed, for example, by a network entity (e.g., such as a BS 110 in the wireless communication network 100) or TRP(s) for resolving paging collisions.

Operations 800 begin, at 802, by detecting, based on paging configurations, a conflict between configured paging occasions of at least two cells on which a user equipment (UE) is camped. At 804, the network entity provides information regarding a new paging configuration designed to resolve the conflict.

According to this first example solution, the UE detects paging collisions (e.g., based on current paging configurations for multiple cells the UE is camped on), and informs one of the cells to resolve the conflict by essentially requesting a new configuration for paging occasions.

When camping on a cell, the UE detects that the paging occasions configured by this cell conflicts with an existing paging configuration on another cell. In response, the UE may send an indication of the paging collision to this cell.

In some cases, the indication may be provided via a (single bit) flag or multi-bit format in an existing RRC message format, such as an RRC Resume message for Inactive mode or RRC Setup Request message for Idle mode. A multi-bit indication may signal a request for a different paging frame (PF) or a delta index for a different PF or a different paging occasion (PO) or a delta index for a different PO (as used herein, the term delta index generally refers to a difference between a calculate index according to a current configuration and the requested index).

In some cases, the indication may be sent in a newly defined RRC message after moving to Connected mode. This new RRC message may include information on paging occasions in the other cell.

For Idle mode UEs, the gNB calculates the UE's initial PF and PO based on a received 5G-S-TMSI (the leftmost 39 bits are sent in RRC Setup Request which is sufficient for this calculation). To help resolve paging collisions, however, additional information may be sent, such as the rightmost 10 bits of the S-TMSI. This may be provided in a 2-step process, provided msg3 is changed. In some cases instead of the leftmost 39 bits, the content may be changed to provide the leftmost 29 bits and the rightmost 10 bits, to keep the payload at 39 bits.

For Inactive mode UEs, the gNB may obtain the UE's 5G-S-TMSI from another network entity (e.g., an anchor gNB), for example, based on an I-RNTI signaled in an RRC Resume Request. In some cases, an Xn Context Retrieve Request/Response may be modified to only deliver (the last 10 digits of) 5the G-S-TMSI (assuming no UE context move).

For Idle mode UEs, the gNB may obtain the last 10 digits of 5G-S-TMSI via an RRC Setup Request message, while the leftmost 39 bits may be sent in RRC Setup Request (as described above).

Regardless of how the gNB obtains the information, the UE then receives a new paging configuration (e.g., with a new PF, a new PO, and/or a new PO starting offset). The PF and PO are calculated initially based on signaled parameters in SIB1 and the UE identity and PO offset is also broadcasted for all UEs. This dedicated configuration allows the NW to over-write this calculation for this particular UE. The new PF or new PO may be signaled by the delta index (as compared to the original PF or PO), rather than signal the full value for security reasons. The signaling may happen via an RRC Release message for Inactive mode UEs (need to check Idle) or via an RRC Reject message for both Idle and Inactive mode UEs.

According to a second example solution, a network entity broadcasts several PO locations where a UE can select a non-conflicting one in an effort to resolve the paging collision.

Figure 9:
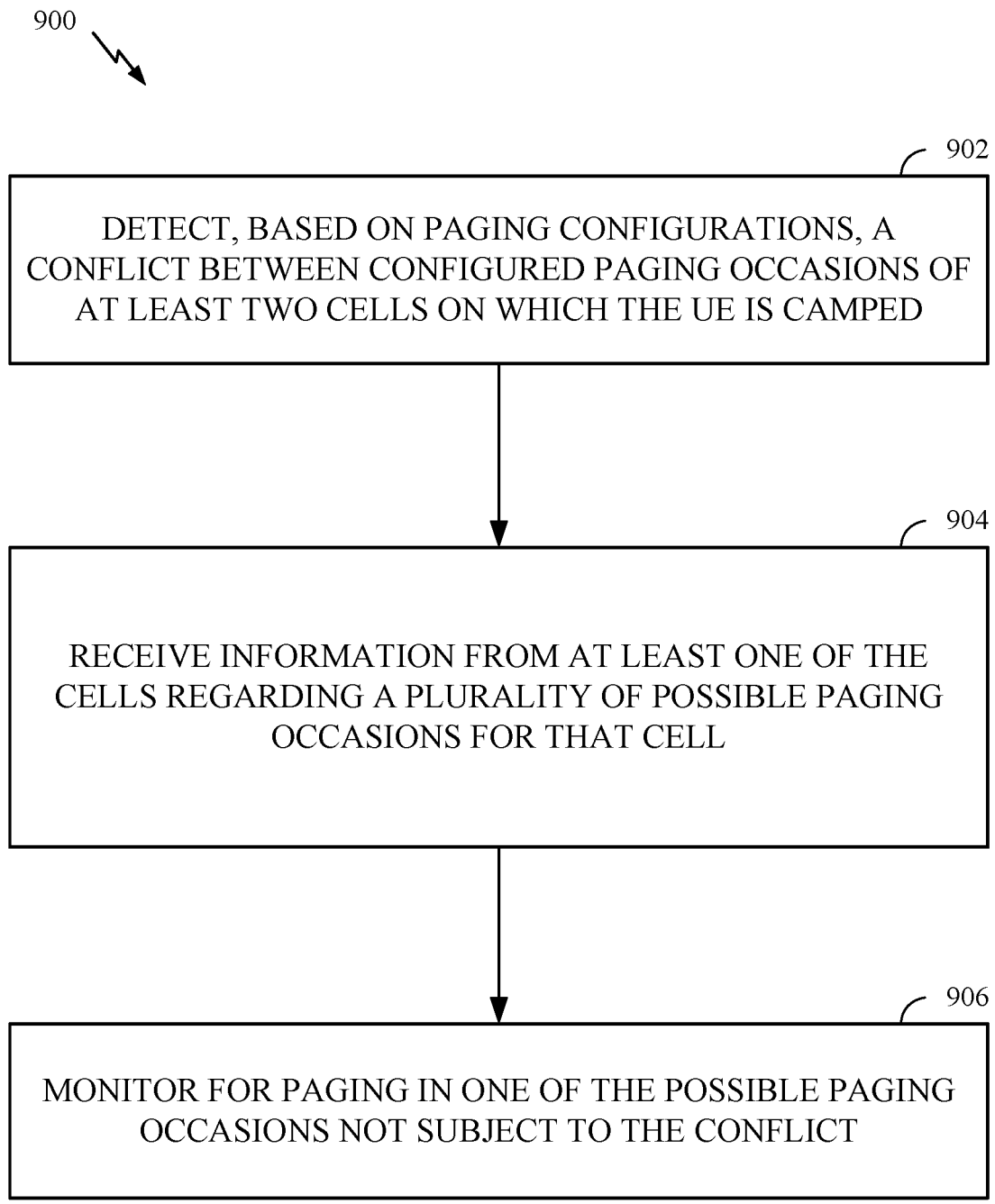
FIG. 9 is a flow diagram illustrating example operations that may be performed by a UE, in accordance with certain aspects of the present disclosure.

FIG. 9 is a flow diagram illustrating example operations 900 by a UE, in accordance with this second example solution. The operations 900 may be performed, for example, by a UE (e.g., such as a UE 120 in the wireless communication network 100) for resolving paging collisions.

The operations 900 begin, at 902, by detecting, based on paging configurations, a conflict between configured paging occasions of at least two cells on which the UE is camped. At 904, the UE receives information from at least one of the cells regarding a plurality of possible paging occasions for that cell. At 906, the UE monitors for paging in one of the possible paging occasions not subject to the conflict.

Figure 10:
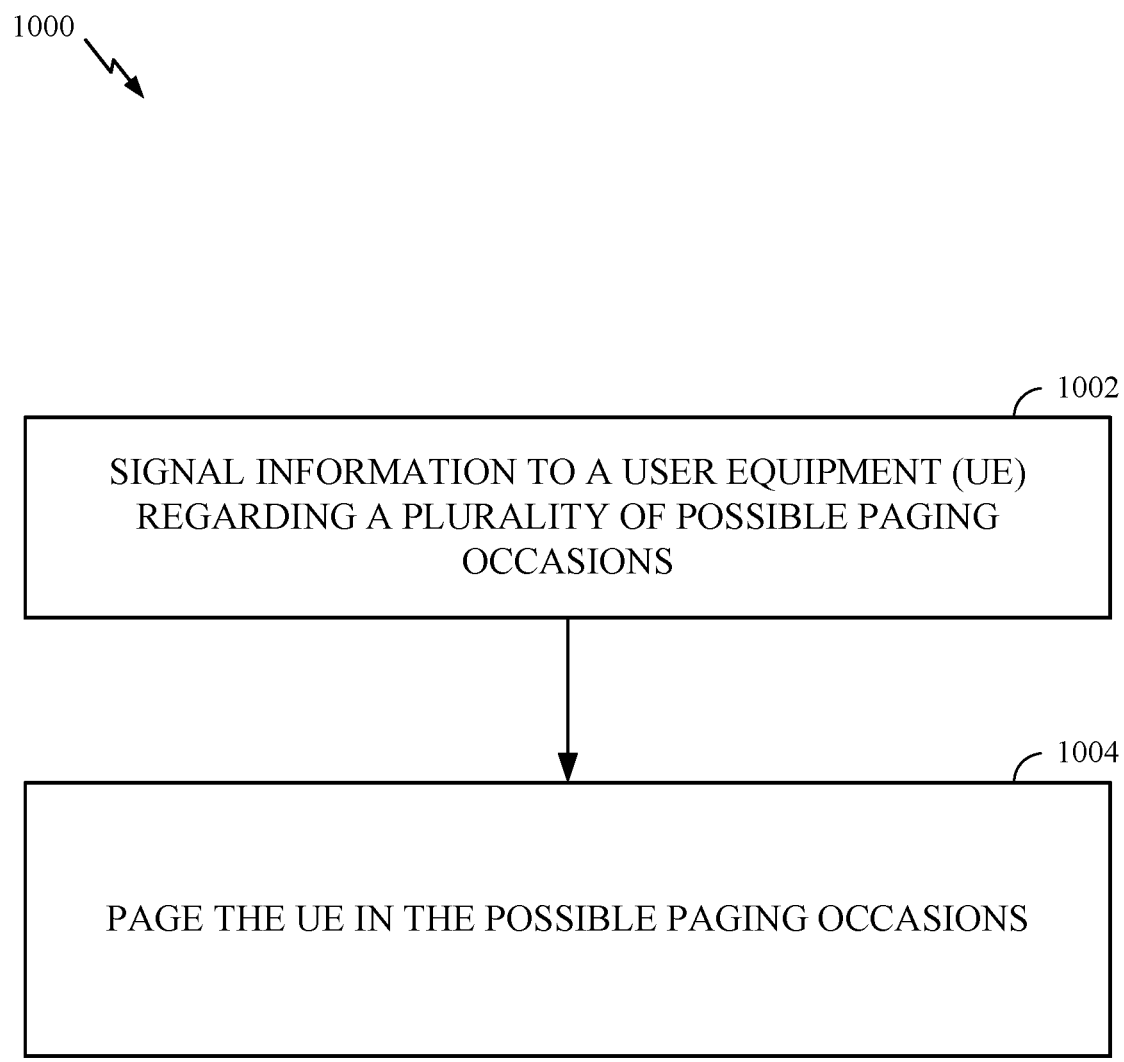
FIG. 10 is a flow diagram illustrating example operations that may be performed by a network entity, in accordance with certain aspects of the present disclosure.

FIG. 10 is a flow diagram illustrating example operations 1000 for wireless communications by a network, in accordance with this second example solution. In other words, operations 1000 may be considered network-side operations that are complementary to operations 900 described above. The operations 1000 may be performed, for example, by a network entity (e.g., such as a BS 110 in the wireless communication network 100) or TRP(s) for resolving paging collisions.

The operations 1000 begin, at 1002, by signaling information to a user equipment (UE) regarding a plurality of possible paging occasions. At 1004, the network entity pages the UE in the possible paging occasions.

According to this second example solution, a gNB may broadcast several PO locations where a UE can select a non-conflicting PO location (one that does not conflict with POs of another cell). This approach may be considered relatively simple from a signaling complexity and standard specification point of view, albeit at the cost of paging overhead since the same UE has to be paged over multiple POs (as the gNB may not know which POs the UE chooses to monitor).

In some cases, the gNB may broadcast a list of index values which can be added to a PF and/or a PO to allow multiple PO locations for a UE (e.g., as a delta with respect to an already calculated PF or PO). The gNB then pages the UE on each of the possible PO locations, while the UE listens for paging on one of the POs which do not conflict with the other cell.

In some cases, for Inactive mode, an anchor gNB may send a modified UE identity index to the other cells in a RAN based notification area (RNA). Assuming all the cells in an RNA use the same paging configuration, the anchor gNB may thus know that a UE has paging conflicts. In some cases, this UE identity index is the last 10 digits for 5G-S-TMSI and the anchor gNB can send a different value which can allow for non-conflicting PF and PO at the cells in the RNA. In some cases, the UE and anchor gNB may agree on this modified UE value, for example, when the UE was connected to the anchor gNB. This value may be updated when appropriate, for example, during RNA updates.

According to a third example solution, a UE may choose to move to another cell to resolve a paging collision.

Figure 11:
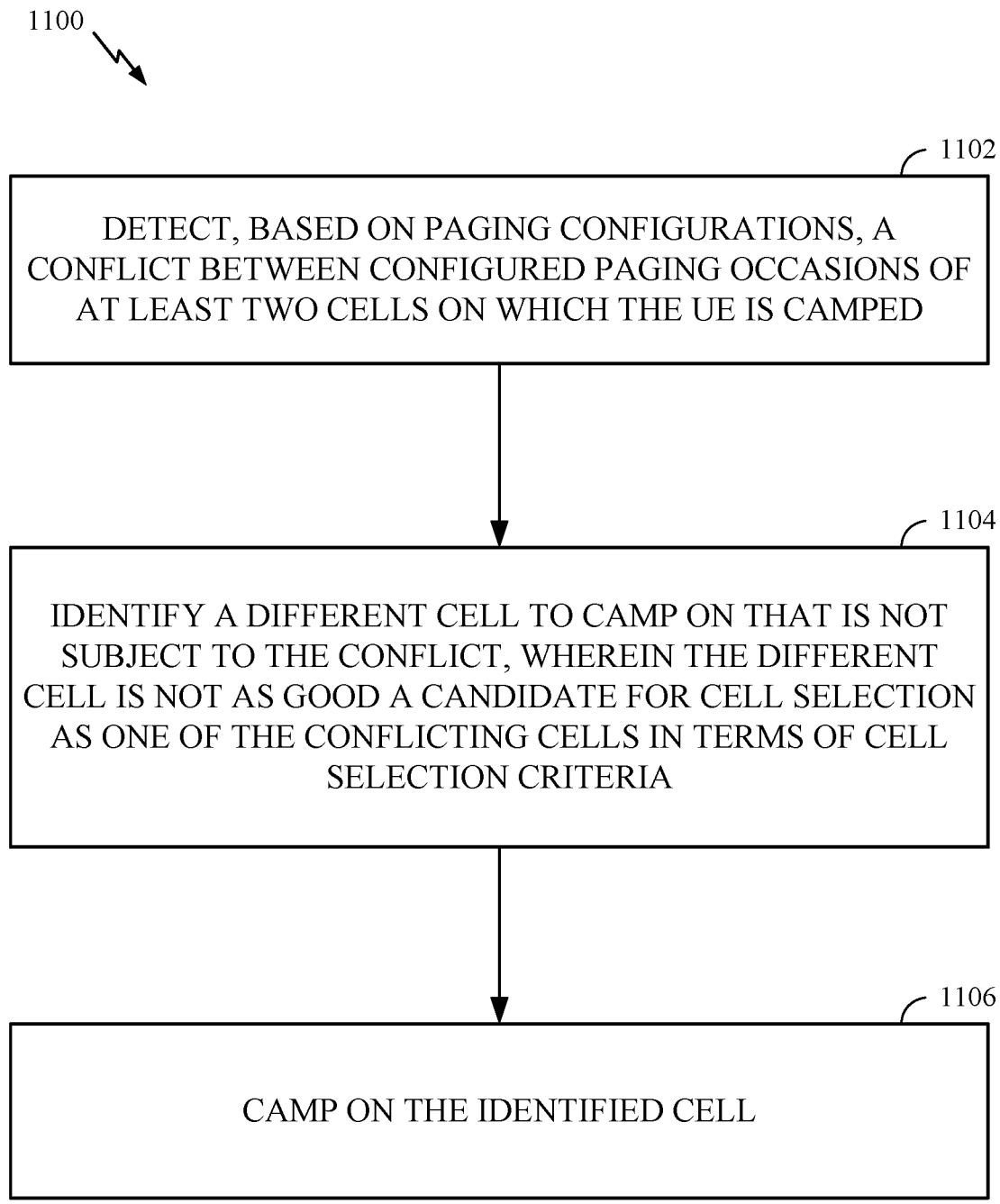
FIG. 11 is a flow diagram illustrating example operations that may be performed by a UE, in accordance with certain aspects of the present disclosure.

FIG. 11 is a flow diagram illustrating example operations 1100 for wireless communications by a UE, in accordance with certain aspects of the present disclosure. The operations 1100 may be performed, for example, by a UE (e.g., such as a UE 120 in the wireless communication network 100) for resolving paging collisions according to this third example solution.

The operations 1100 begin, at 1102, by detecting, based on paging configurations, a conflict between configured paging occasions of at least two cells on which the UE is camped. At 1104, the UE identifies a different cell to camp on that is not subject to the conflict, wherein the different cell is not as good a candidate for cell selection as one of the conflicting cells in terms of cell selection criteria. At 1106, the UE camps on the identified cell.

According to this third example solution, for example, the UE can try to camp on another cell without paging collisions. Because this other cell may not be the best candidate cell to camp on in terms of signal quality, this approach may result in some performance degradation for both the UE and the network. This performance degradation may not be as severe, however, as performance degradation caused if the UE is unreachable due to a paging collision. A UE may camp on another cell when the chosen best one has a paging collision and may choose the other cell, for example, after reading SIB1s of cells during cell reselection and/or by reading SIB1 of the best cell and then performing cell reselection again.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    detecting, based on paging configurations, a conflict between configured paging occasions of at least two cells on which the UE is camped;
    identifying a different cell to camp on that is not subject to the conflict, wherein the different cell is not as good a candidate for cell selection as one of the conflicting cells in terms of cell selection criteria, wherein the different cell is identified based on reading broadcast system information only from cells that are not subject to the conflict during a cell reselection procedure; and
    camping on the identified cell.

2. The method of claim 1, further comprising reading the broadcast system information for the cells not subject to the conflict during cell reselection.

3. The method of claim 1, further comprising reading the broadcast system information for the cells not subject to the conflict prior to performing cell reselection.

4. An apparatus for wireless communications by a user equipment (UE), comprising:
    memory having executable instructions stored thereon; and
    one or more processors configured to execute the executable instructions to cause the apparatus to:
        detect, based on paging configurations, a conflict between configured paging occasions of at least two cells on which the UE is camped;
        identify a different cell to camp on that is not subject to the conflict, wherein the different cell is not as good a candidate for cell selection as one of the conflicting cells in terms of cell selection criteria, wherein the different cell is identified based on reading system information only from cells that are not subject to the conflict during a cell reselection procedure; and
camp on the identified cell.

5. The apparatus of claim 4, wherein the one or more processors are configured to cause the apparatus to read the broadcast system information for the cells not subject to the conflict during cell reselection.

6. The apparatus of claim 4, wherein the one or more processors are configured to cause the apparatus to read the broadcast system information for the cells not subject to the conflict prior to performing cell reselection.

7. An apparatus for wireless communications by a user equipment (UE), comprising:
   means for detecting, based on paging configurations, a conflict between configured paging occasions of at least two cells on which the UE is camped;
   means for identifying a different cell to camp on that is not subject to the conflict, wherein the different cell is not as good a candidate for cell selection as one of the conflicting cells in terms of cell selection criteria, wherein the different cell is identified based on reading system information only from cells that are not subject to the conflict during a cell reselection procedure; and
   means for camping on the identified cell.

8. The apparatus of claim 7, further comprising means for reading broadcast system information for the cells not subject to the conflict during cell reselection.

9. The apparatus of claim 7, further comprising means for reading the broadcast system information for the cells not subject to the conflict prior to performing cell reselection.

10. A non-transitory computer-readable medium having executable instructions stored thereon which, when executed by one or more processors, causes a user equipment (UE) to perform an operation comprising:
    detecting, based on paging configurations, a conflict between configured paging occasions of at least two cells on which the UE is camped;
    identifying a different cell to camp on that is not subject to the conflict, wherein the different cell is not as good a candidate for cell selection as one of the conflicting cells in terms of cell selection criteria, wherein the different cell is identified based on reading system information only from cells that are not subject to the conflict during a cell reselection procedure; and
    camping on the identified cell.

11. The non-transitory computer-readable medium of claim 10, further comprising reading the broadcast system information for the cells not subject to the conflict during cell reselection.

12. The non-transitory computer-readable medium of claim 10, further comprising reading the broadcast system information for the cells not subject to the conflict prior to performing cell reselection.

* * * * *